PROJECTION OFFSET SYSTEM

Filed Oct. 4, 1963 5 Sheets-Sheet 1

DANIEL H. ROBBINS
HENRY N. FAIRBANKS
INVENTORS

BY Stanley Belsky
Laurence P. Benjamin
ATTORNEYS

DANIEL H ROBBINS
HENRY N. FAIRBANKS
INVENTORS
BY Stanley Bilsky
Lawrence P. Benjamin
ATTORNEYS DANIEL H. ROBBINS
HENRY N. FAIRBANKS
INVENTORS
BY Stanley Belsky
Lawrence P. Benjamin
ATTORNEYS DANIEL H. ROBBINS
HENRY N. FAIRBANKS
INVENTORS
BY Stanley Bilsky
Lawrence A. Benjamin
ATTORNEYS

PROJECTION OFFSET SYSTEM

Filed Oct. 4, 1963

DANIEL H. ROBBINS
HENRY N. FAIRBANKS
INVENTORS

BY Stanley Belsky
Lawrence P. Benjamin
ATTORNEYS

United States Patent Office 3,283,647
Patented Nov. 8, 1966

3,283,647

PROJECTION OFFSET SYSTEM

Henry N. Fairbanks and Daniel H. Robbins, Rochester, N.Y., assignors, by mesne assignments, to Itek Corporation, Lexington, Mass., a corporation of Delaware Filed Oct. 4, 1963, Ser. No. 314,023
2 Claims. (Cl. 88—24)

This invention relates to systems for producing offset plates and more particularly to a variable magnification projection device capable of automatically and accurately producing offset plates from documents, originals, or facsimiles.

The subject invention represents the culmination of a series of attempts extending over a long period of time, all of which had, as their goal, a time and labor saving improvement in the art of making master plates for use in offset presses. The characteristics of available material for the device has made the device particularly suitable for the short run to medium run offset plate making art. As will be shown, the preparation of this type of offset master is a tedious and time consuming process wherein labor cost represents the major expense. This invention materially reduces labor cost in the order of 30:1. That is, the time to prepare an offset plate for press is reduced from about one half hour per plate to 60 seconds per plate. In addition, the master produced by the present invention will be as serviceable as anything previously known in the short run to medium run offset art and has some superior qualities as will be further explained.

One of the important features of the subject invention is that the time, and therefore the cost to produce an offset process master plate is considerably reduced while concurrently acquiring quality and convenience as an end result.

Since the subject invention is admittedly similar in some respects to equipment that is previously known, it is felt at this point that perhaps a detailed explanation of some of the prior art methods is perhaps necessary so that there will be a greater appreciation of the features of the present invention.

One of the prior methods that is very commonly used to produce an offset master is a flat bed device employing the xerographic principle. With this device the operator performs the following steps. The first step is to place the copy of which the plate is to be made on the copy bed. At the same time, and at another station a selenium plate is charged, which plate must be handled in a light-free environment That is, the plate is loaded and transported in a light-tight film holder similar to a cut film holder and at least for the first few steps must be processed in the dark. Once charged, the plate is covered and then is placed in a camera back where the cover is removed and it is exposed. Thereafter, the cover is replaced and the exposed plate is brought to a dusting box where the cover is removed and the charged plate is dusted with a "toner" which will, according to the xerographic process, adhere to the non-charged areas. It is this toner step that makes for subsequent difficulties because thereafter the dusted toner plate is transferred to a direct image offset master. Since the toner is originally in the form of dust, and the dusty material is deposited over the entire surface of the plate, the plate must be cleaned of excess toner material from the charged area. This must be done with a special antistatic cotton so as not to recharge areas during the cleaning process. At this point much of the unwanted toner has been removed but it is necessary to still further clean the offset master. The next cleaning step is performed by hand with a kneaded eraser, which is very time consuming. This latter cleaning process that often requires up to 20 minutes per plate even for an experienced operator and, depending on both the skill of the operator and the quality of the final product desired, may frequently run considerably more than 20 minutes.

Thereafter, the toner is fused to the plate and the plate is ready to be placed in the press. Here again, it is necessary in the normal course using the xerographic process to perform a final cleaning operation. An abrasive material is used to remove the very fine specks which only now become evident.

Thus, there are at least three cleaning steps involved, one of which even involves using abrasive material, and all of which tend to produce a non-uniform plate surface. That is, if more processing is required in a particular spot, then that spot will become lighter before the others, producing an offset master which has a relatively short life.

Another process, and still older than the xerographic process, is the "original" method of producing offset plates. This process, too, requires considerably more time than the process of the subject invention principally because of the steps required. In this latter method the copy is first placed on the copyboard. A film is exposed and then must be treated in the same manner as any photographic material, that is the usual darkroom techniques are required. The exposed film is taken back into the darkroom where it is developed, fixed, washed, and dried. This process, too, is rather time consuming since it is necessary to carefully regulate both the temperature of the developing solution and the time the film is kept in the solution. Thereafter, the film is "masked," that is, it is cut up and placed into position on a specially ruled paper opaque to the image light. After having been stripped the film is reinspected and an opaquing process is performed to cover up any pinholes which will now become apparent and are the result of the processing. After opaquing, the image is transferred to a pre-sensitized plate by exposing the plate through the negative to a very bright arc light which is transmitted through the clear image area in the film. Thereafter, the image is developed on the sensitized plate, washed, fixed, and cleaned before it can go to the press. Here, too, a highly skilled operator will require at least twenty minutes to a half hour to process a plate from start to finish.

Still another type of offset master is known generally as the "direct image" master wherein the operator may type or print the material to be utilized directly on the master. While this last procedure is simple insofar as certain operations are concerned, it will be obvious to one skilled in the art that while one can draw on the offset material one cannot reproduce original drawings thereon. Similarly, it is lacking in certain fidelity in that in the instances where material is typed directly on the master, any variations in typing pressures soon manifest themselves. While this last system may be the simplest, the offset printing industry has found this latter process to be the least desirable except in isolated instances.

In the process of the subject application, as distinguished from the other previously mentioned processes, the operator has only to place the copy on the copyboard, and adjust the position of the copyboard to achieve the desired reduction or magnification, which may vary from between 50 percent to 110 percent of the original. Once this is done, it is then only necessary to determine how many masters are needed and press a button to start the system working. Thereafter, the process carries on automatically and at the output thereof one complete master is produced every 30 seconds. This system can produce solids which are not possible in the xerographic process since it is well known that the charge distribution pattern over large solid areas is non-uniform in a xerographic process.

Prior art processors for automatically processing sensitized sheet material, such as the one shown in U.S. Patent No. 2,889,762 assigned to the common assignee of this invention, have been found to be unsatisfactory for processing projection offset plate material such as the material marketed by the assignee under the trademark "Project-A-Lith."

This material is characterized by a paper sheet that is plastic coated on both surfaces. On top of one of the plastic coatings is a sensitized emulsion. The overall thickness of this sheet is in the order of .007" thick. The sheet is inherently stiff in contrast to typical sensitized paper. Thus, problems of transporting this sheet through the processor are increased. The problems of transportation are further increased by the emulsion surface becoming extremely soft as it is exposed to the developing agents. The soft emulsion ordinarily has a tendency to mar or become embossed during transportation through the automatic processor. Any physical damage to the emulsion affects the quality of the final printed copy. Considerable difficulty has been experienced in trying to turn this material as it passes vertically down and then up through processing tanks such of the type shown in U.S. Patent No. 2,889,762. The present invention has a unique construction for facilitating transportation of the sheet through the processing solutions without physically damaging the emulsions.

Equating the advantages of the subject invention to terms of time, cost, convenience and quality, the instant system will produce copies in a considerably shorter period of time than prior art methods. By reducing the time to produce one of these masters the overhead costs are reduced materially and the convenience of having a master produced in such a short time becomes a highly desirable feature. Still another benefit derived is that the quality of the masters produced by the subject system and process are in every way equal to and, in instances where a xerographic process is used, of considerably higher quality since there is no longer the need to indulge in the three part cleaning system.

It is, therefore, a principal object of the present invention to provide a system capable of taking a picture suitable for use as an offset master and automatically processing it.

Another principal object of the present invention is to provide an improved processing device suitable for automatically processing offset masters.

Still another principal object of the present invention is to provide an improved processing machine capable of automatically processing copy material into offset masters.

It is a further object of the present invention to provide an improved processing machine capable of producing at a rapid rate offset plates, ready for press.

A further object of the invention is to provide an apparatus for economically reproducing offset plates from copy at variable magnifications.

A still further object of the invention is to provide a method and apparatus for transporting offset plates in a processing apparatus without marring or embossing the emulsion surface thereof.

These and other important objects and advantages of the invention will be more fully set forth in the following description taken in conjunction with the accompanying drawing in which like reference numerals refer to similar parts throughout the several views and in which.

Figure 3A:
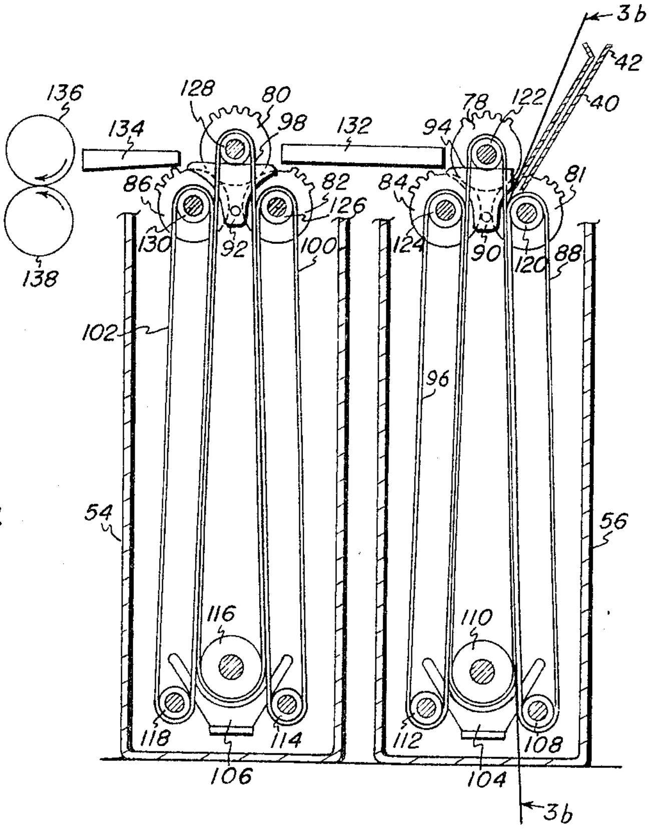
Figure 3B:
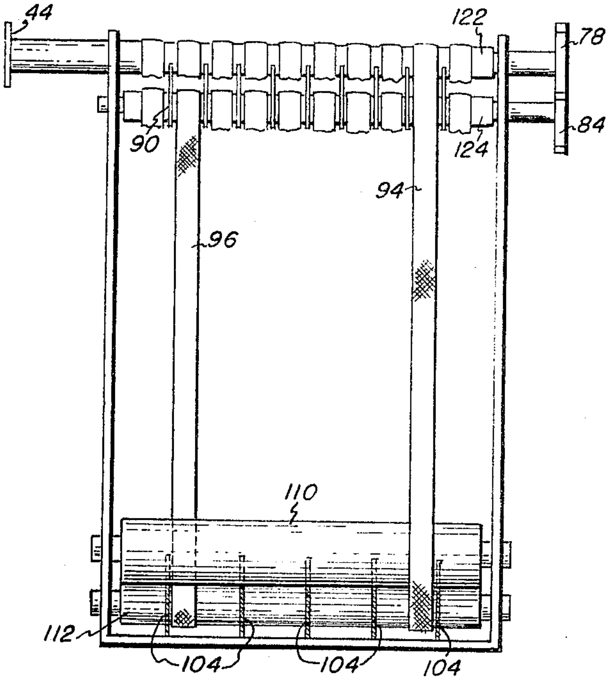
Figure 3C:
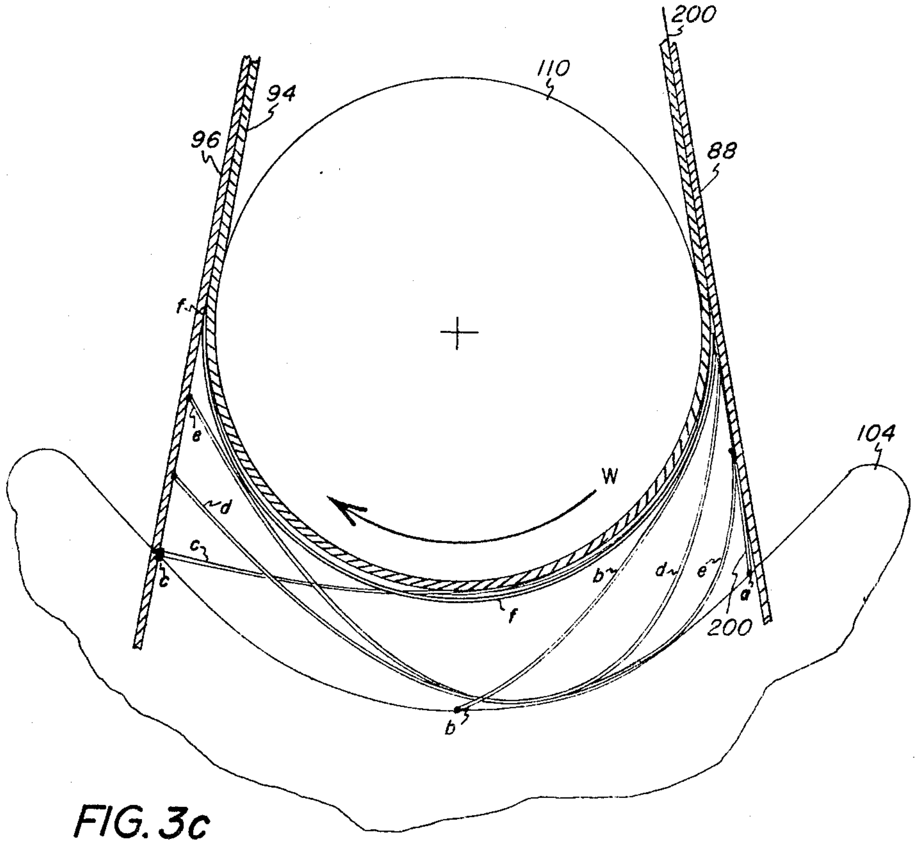
Figure 4:
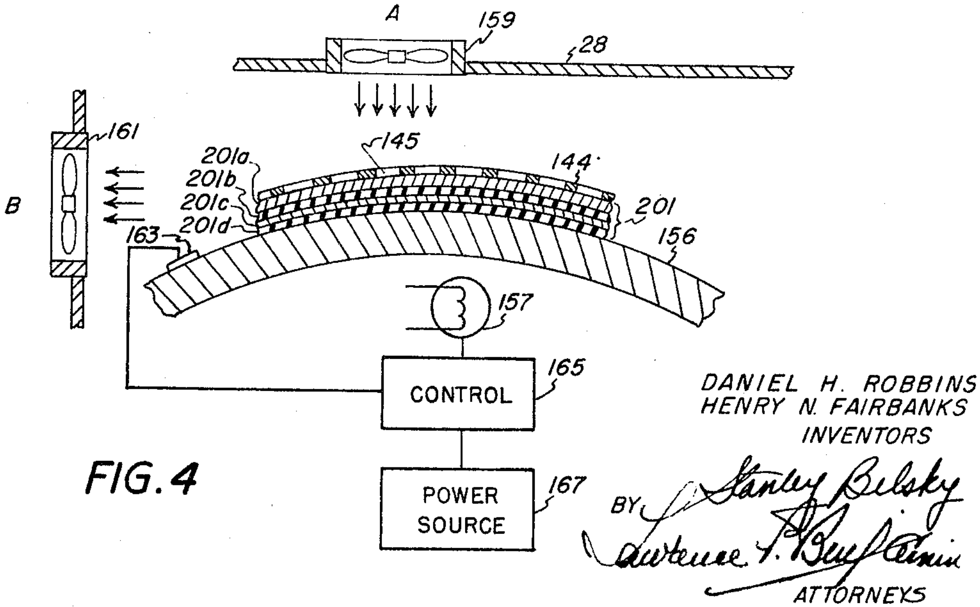
Figures 5, 6:
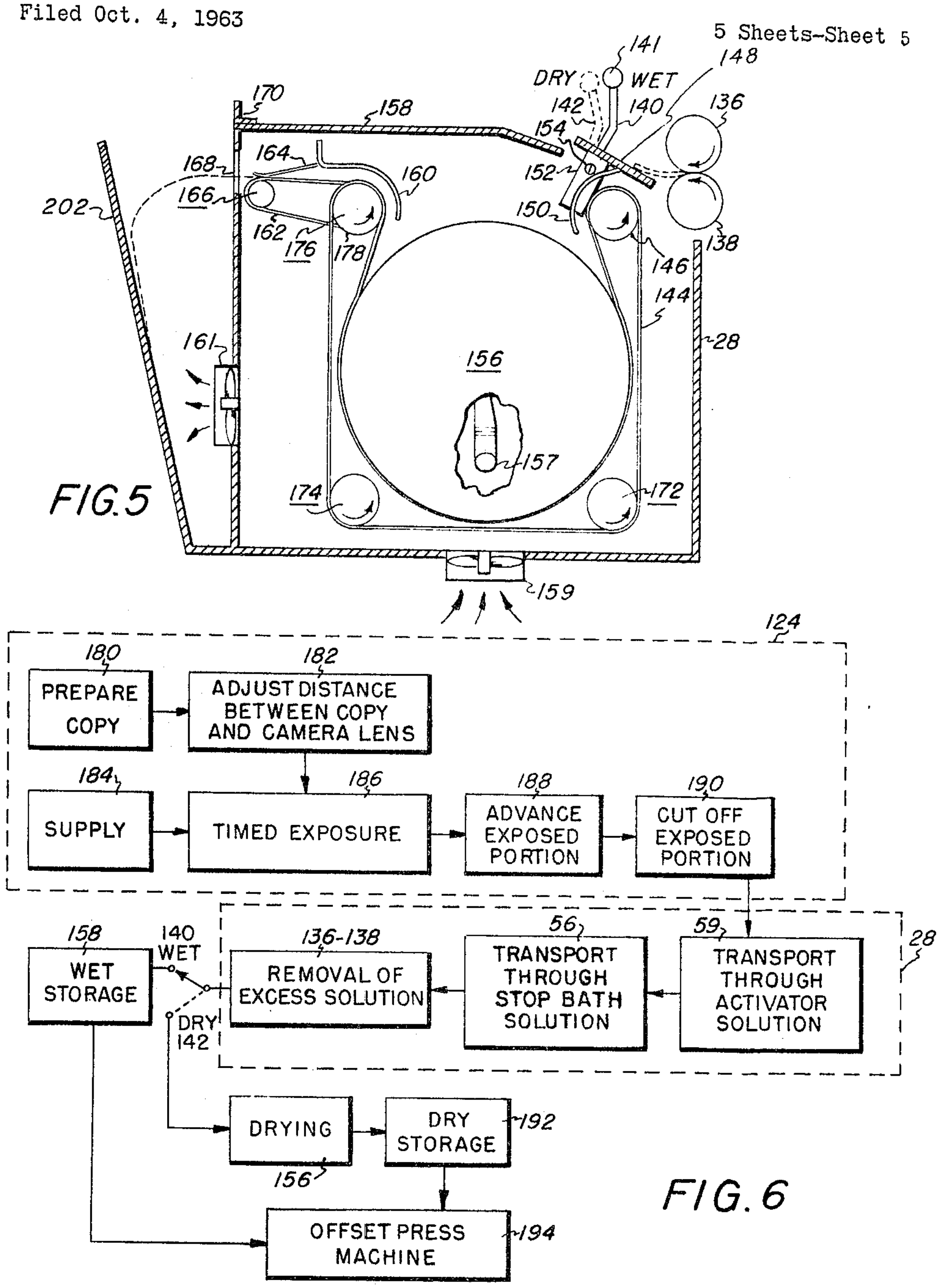

FIG. 3*a* is a side sectional view of the processing tanks of the subject invention showing the belt frame assembly for transporting the exposed photographic material through the respective processing tanks;

FIG. 3*b* is a front elevation view of the belt frame assembly of FIG. 3*a* taken along lines **3*b*—3*b***;

FIG. 3*c* is a schematic illustration of the turning of the offset plate material in a processing tank;

FIG. 4 is a schematic diagram illustrating the operation of a dryer suitable for use with the subject invention;

FIG. 5 is a partially schematic diagram illustrating another embodiment of the invention incorporating the dryer of FIG. 4;

FIG. 6 is a block diagram of the system with the dryer.

Figure 1:
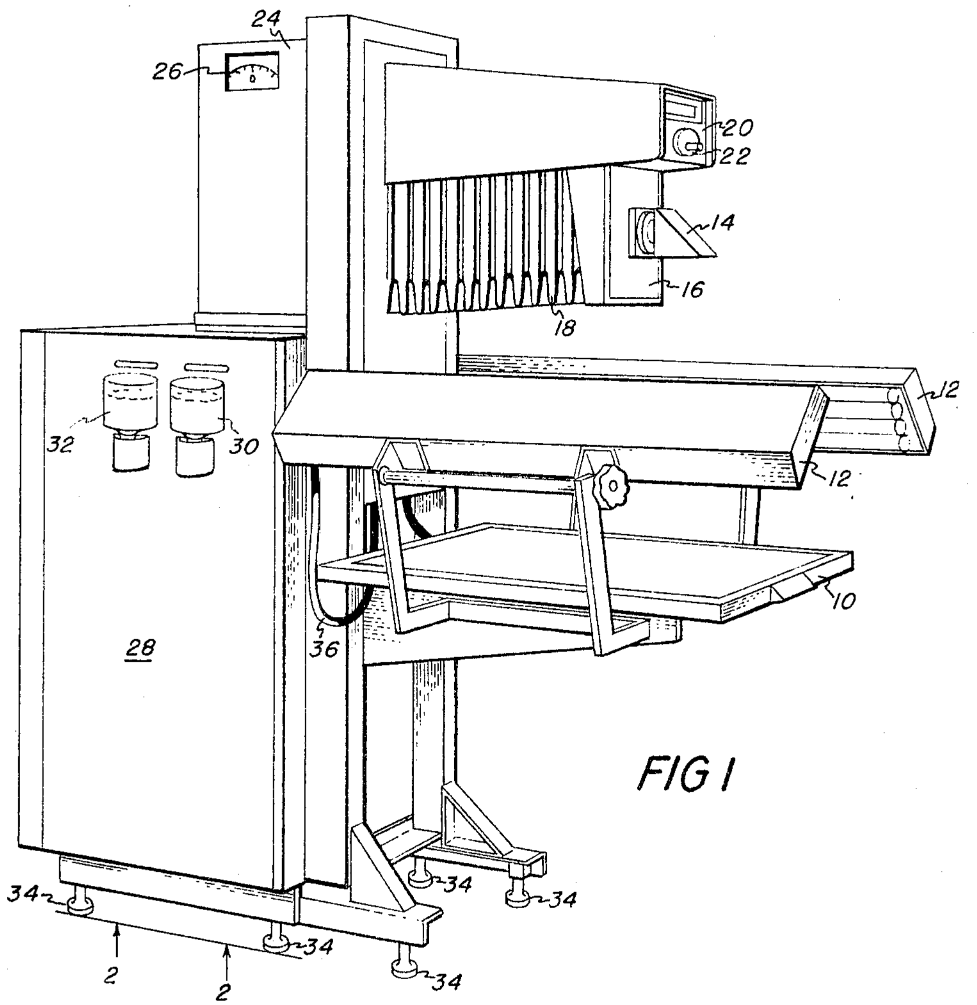
FIG. 1 is an overall view of the copying machine of the subject invention.

Referring to FIG. 1 there is depicted an overall view of the preferred copying and processing machine of the subject invention indicating an easel 10 on which the material to be copied is mounted. This work is illuminated by means of lights 12 which provide a high intensity light on the copy material. The copy is projected and imaged by means of lens-prism combination 14 mounted on plate 16 which forms the front end portion of the system. Bellows 18 provides an appropriate light tight transition between the lens system 14 and the offset plate material which is contained within housing 24. The offset plate material (not shown) for use in this invention is in roll form with a calibrated dial 26 to give the operator an indication of the length of exposed copy.

A preferred offset plate material has recently become available. It has many desirable characteristics capable of fulfilling the requirements of each of reproduction as well as a significant reduction in processing time when used in accordance with this invention. This material is marketed in roll form by the assigned of the subject application under the trademark "Project-A-Lith." The characteristics of this material are that it is a silver process having an orthochromatic emulsion requiring imaging by means of light reflected from the background of an original. The print surfaces are therefore formed by subtraction of ink receptive areas, rather than by additions to these areas.

The front end portion of the system has a camera carriage support means 20 on which is mounted a carriage positioner 22 which may for example, comprise a rack and pinion to horizontally position the lens-prism 14 over the work material on easel 10. Additional means (not shown) are used to raise and lower easel 10. These adjustments are for varying the magnification and for adjusting the focus.

There is also contained within housing 24 a knife edge and offset plate material advancing mechanism for cutting off the exposed film and introducing it into the processing portion of the system after the exposure has been made. For a more detailed explanation of a typical knife edge and advancing mechanism, particularly suited to the subject invention, attention is directed to the United States Patent Number 2,705,907 issued to A. W. Caps et al. on April 22, 1955 and assigned to the assignee of the subject application.

The processing portion of the system is contained within housing 28 and will be described in more detail in the subsequent description of FIGS. 2, 3*a*, 3*b* and 3*c*. There is also shown replenishing containers 30 and 32 having contained therein the activator and the stop bath respectively, which are used to keep the liquid above a predetermined level. The activator is roughly analagous to the developer solution, while the stop bath is comparable to the fixing solution more normally found in the prior art developing system.

Leveling feet 34 are here provided to maintain the system in a level condition, while wires 36 allow the lights 12 to be raised or lowered with the easel 10.

Figure 2:
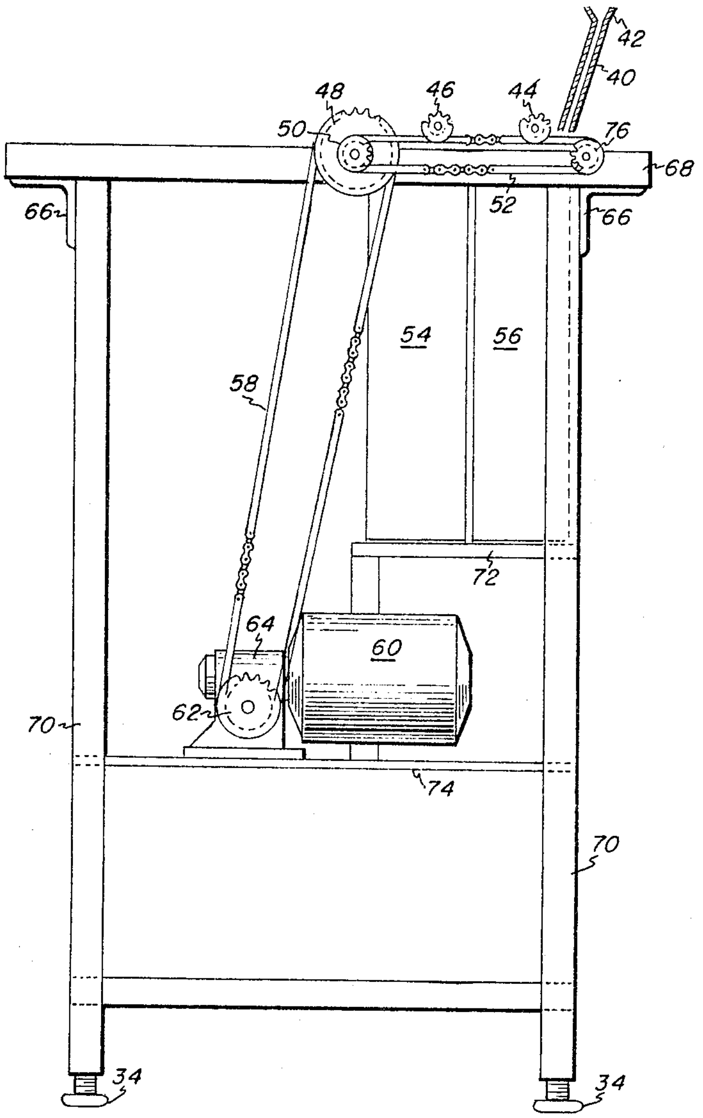
FIG. 2 is a side elevation view taken along lines 2—2 of FIG. 1 and shows a partial sectional view of the processing parts of the subject invention.

Referring now to FIG. 2 there is shown a side view of the processing portion of the system of the subject invention taken along lines 2—2 of FIG. 1. In this view motor 60 drives the belt frame assembly which will be described in more detail with regard to FIGS. 3*a* and 3*b*. The belt frame assemblies are contained within tanks 56 and 54 which contain the activator fluid and stop bath respectively for processing the exposed offset plate material.

Motor 60 is energized by an appropriate source of power (not shown) and is connected directly to gear reduction box 64, the output of which rotates the driver sprocket 62. Driver sprocket 62 is connected to the main drive sprocket 48 by means of chain 58. Mounted on the same shaft as main drive sprocket 48 is driver sprocket 50 which is connected to idler sprocket 76 by means of chain drive 52. Belt frame driver sprockets 44 and 46, forming a part of the belt frame assembly, are mounted for engagement with main drive chain 52. Thus, when motor 60 is suitably energized, power is applied to the intervening drive means to rotate driver sprockets 44 and 46 to appropriately carry the exposed offset plate material through the tank developing stages.

The belt frame assemblies and sprockets 48, 50 and 76 are mounted on main support platform 68 which support platform is affixed to frame 70 by means of angle brackets 66 or any other suitable means. In addition, there is provided a platform 72 to support tanks 54 and 56 and a motor platform 74 to support motor 60 and gearbox 64.

In addition, there is also shown a guide means 40 having at its upper end a hopper 42 which will accept the exposed offset plate material and guide the material into the first processing tank. For long lengths, cut-off of exposed material occurs after its leading edge is immersed. The guide 40 continues to guide the unimmersed material into the solution after cut-off. Leveling feet 34 are used to level the system at installation.

Referring now to FIGS. 3*a* and 3*b*, there is shown the belt frame assemblies suitable for use in tanks 54 and 56 (FIG. 2). Belt frame driver sprocket 44, as shown in FIG. 2, is driven by means of motor 60 through chains 58 and 52 and sprockets 62, 48 and 50 respectively. In the activator belt frame assembly for tank 56 sprocket 44 is affixed to the activator drive shaft 122 to one end thereof, and at the other end, there is an activator drive gear 78. This drive gear 78 meshes with both the activator input drive gear 81 and the activator output drive gear 84. Drive gear 81 is mounted on the input drive shaft 120 while output gear 84 is mounted on drive shaft 124. Mounted on shafts 120, 122, and 124 are belts 88, 94, and 96 respectively. The activator input belts 88 are driven around the input idler shaft 108. Similarly, activator driver belts 94, associated with shaft 122, have an idler 110 while the activator output belts 96 have an associated output idler shaft 112. Thus, a portion of input belts 88 and driver belts 94 are in vis-a-vis, lightly contacting relation to accept and transport the plate material while a portion of output belts 96 is in similar vis-a-vis contacting relation with another portion of driver belts 94 to accept and transport the plate material after it is turned by turning blade 104.

In addition, there is provided activator turning blades 104 and activator deflector means 90, the operation both of which will be described subsequently. All of these elements constitute the activator belt frame assembly and is, when in its operating position immersed in tank 56 which has contained therein the suitable activator fluid.

Referring now to FIG. 3*c*, there is here schematically illustrated the turning of the offset plate material as it reverses its direction of travel in the activator tank. The offset plate material 200 is a plastic coated paper having an emulsion surface on one of the plastic coated sides. In FIG. 3*c*, the emulsion coating is in contact with the belt 88. The plate material has a thickness of about .007 inch. The paper is inherently stiff and the emulsion surface is characteristically soft when the sheet is in the activator tank. With the idler roller 110 turning in the direction W, the sheet 200 is transported down in FIG. 3*c* between belts 88 and 94. The leading edge contacts the turning blade 104 at *a*. As the paper is continually transported down, the leading edge travels along the arcuate surface of the turning blade through the position *b* and *c* when it contacts belt 96. The emulsion coating during this portion of the travel of the sheet does not come in contact with the turning blade guide surface. The curve of the paper is also shown in this illustration as it passes from position *a* to position *c*. It will be noted, that after the paper is guided along the turning blade from the position *a*, it forms a substantially triangular wedge between the emulsion surface and the turning blade surface. It is believed that this wedge is helpful in building up a fluid bearing between the emulsion surface and the turning blade guide surface as the sheet travels from the position *c* to *f* between belts 96 and 94. When the sheet 200 comes in contact with the belt 96 it is carried up through positions *c*, *d*, *e*, and *f*. At *f* it is grabbed by belts 96 and 94. The shape of the sheet during the latter portion of its travel is also illustrated schematically.

It is believed that at no time during the travel of the sheet is the turning blade guide surface between the belts 96 and 88 contacted by the emulsion surface. The liquid bearing supports the sheet on the surface even when the leading edge is at point *e*. As soon as the sheet is grabbed between belts 96 and 94 (point *f*) and pulled up, it has been observed that the sheet then assumes the position *f* adjacent to the belt 94 but not in contact with it as it is turned in the direction of the arrow W.

The minimum spacing between the turning blade guide surface and the belt 94 is selected so as to prevent the soft emulsion on the offset plate from being physically embossed or marred by the turning blade.

The belt frame assembly suitable for use in the stop bath tank 54 is similar in all respects to the belt frame assembly previously described with the exception of a slightly different configuration at the leading edge of deflector element 92. In this belt frame assembly the belt frame driver 46 (FIG. 2) is attached to one end of the stop bath drive shaft 128. The other end of the drive shaft 128 has drive gear 80 affixed thereto. Drive gear 80 meshes with and drives the stop bath input gear 82 and stabilizer output gear 84. The stop bath input gear 82 has an input shaft 126 affixed thereto, while the stabilizer output sprocket has an output shaft 130 affixed thereto. Belts 100, 98 and 102 are mounted on shafts 126, 128 and 130 respectively with the belts in vis-a-vis relation as stated with regard to the belt frame assembly of tank 56. Shafts 114, 116 and 118 associated with belts 100, 98 and 102 respectively, provide supports therefor, while turning blade 106 also performs the same function as previously described with respect to the activator belt frame assembly of tank 56. The stop bath belt frame assembly, when in its operating position, is also located within the liquid of tank 54.

Once the offset plate is exposed it proceeds into hopper 42, is cut from the roll and proceeds down through the fluid into activator tank 56. When the leading edge of the paper traverses through guide 40 and exits therefrom at the lower end, the offset plate material immediately enters between belts 94 and 88. It should be here mentioned that all the belts that are used to transport the offset plate material are usually made from very porous or coarsely woven material that is not subject to being acted upon the chemicals of either solution, that is, chemically inert. They must not be susceptible to stretching nor should they mar or scratch the soft emulsion. Another important function of the belt is that it must allow for easy access of the fluid through the material to the offset plates. That is, the presence of the belt must in no way inhibit the action of fluid on the offset plate material. It has been found that a coarsely woven Saran is well suited for this type of application.

The offset plate, having been deposited between belts 94 and 88, is then transported from the upper input end of the belt frame assembly down towards the bottom of the tank. Once the offset plate emerges from belt 88 it immediately comes into contact with the activator turning blade 104 which causes the plate to reverse itself approximately 180° and is now pushed between the combination of belts 96 and 94 with the leading edge now being pulled upward.

Once the plate has transferred down the length of the tank and then back up, it comes into contact with activator deflector 90 which deflects the plate downward into a somewhat horizontal direction. Immediately thereafter, the plate comes into contact with the intermediate guide bar 132 which serves to further deflect the plate downward and guide it so that the leading edge thereof, falls under the leading edge of the stop bath deflector 92. As soon as this happens, the leading edge of the plate is picked up by belts 98 and 100 in the same manner as previously described with respect to the activator belt frame assembly. Thereafter, the plate is caused to travel down through the stop bath solution, having its direction reversed by the stop bath turning blade 106 and directed upward in such a manner as to be picked up by the combination of belts 98 and 102 to be pulled up. Upon reaching the top, the plate is deflected by the trailing edge of deflector 92 to output guide bar 134 which is utilized to deflect the paper between squeegee rollers 136 and 138.

At this point squeegee rollers 136 and 138 remove the surface fluid from the master and deliver the master through an opening 139 in the rear wall of housing 28. If it is desired to utilize the master within a short time after processing no further operations are required. However, there are many instances when many masters are made at the same time and from the same copy for the purpose of utilizing the extra copies of the master at a later date. The masters to be utilized later have to be dried before storage. For this purpose the masters may be placed in a dryer such as the one disclosed in United States Serial No. 313,880, filed Oct. 4, 1963, a co-pending application of the common assignee of this invention, now U.S. Patent No. 3,286,367.

Referring now to FIGS. 4 and 5 there is here illustrated a dryer suitable for use with the copying machine described in conjunction with FIGS. 1 through 3*c*. FIG. 4 is a schematic illustrating the operation of the dryer, and FIG. 5 is a sectional view of the dryer-copying machine combination. Referring more particularly to FIG. 4 it is here illustrated the broad principles of operation of the dryer useful with the present invention. In FIG. 4 the sheet is designated by the numeral 201. This material, by way of example, has four layers, an emulsion layer **201*a*, a plastic coating 201*b*, a carrier sheet 201*c*, and a plastic coating 201*d*. The sheet 201 is fed into the dryer housing 28 so that the plastic coating 201*d* is in contact with a heated platen 156. The platen is heated by a heat source 157 which may, for example, be a source of radiant energy. A control 165 controls the electrical input to the heat source 157. The heat source maintains the platen 156 at a substantially constant temperature by means of a sensor 163 which senses the surface temperature of the platen and cooperates with the control to selectively turn the heater 157 on and off. A contact means 144 maintains the sheet in intimate contact with the platen 156 during a portion of its travel through the dryer. The contact means provide uniform contact between the sheets and the heating surface thereby preventing air spaces from developing between the platen and the sheet. Any air space developed would be a local insulator causing non-uniform drying of the sheet. As a practical matter, it has been found that most of the moisture in this type of material as it enters the dryer is in the emulsion. If the material is squeegeed prior to drying most of the moisture is removed from the exposed plastic coated surface. The contact means 144 is provided with perforations 145 for allowing moisture to escape from the emulsion layer 201*a*. The emulsion layer is heated by conduction of heat from the platen 156 through the layers 201*d* 201*c*, and 201*b*. The temperature of the emulsion surface rises due to the conducted heat initiating vaporization of moisture at the surface. A blower 159 is mounted in the housing 28 and forces ambient air against the emulsion surface to accelerate vaporization of the moisture therein. An exhaust system, as shown by the exhaust fan 161, has been found to be useful in further accelerating the vaporization of the moisture therein. It continually removes moisture from the housing 28** in the direction B, thereby maintaining a desired humidity level in the housing as the moisture is evaporated from the emulsion surface.

A dryer used in conjunction with the subject invention is shown in FIG. 4 which is a side sectional view. The dryer is integral with the processing machine and generally contained within housing 28. It should be here noted that during the course of travel of the offset plate material through the activator and stop bath solutions and through squeegee rollers 136 and 138 the offset plate material passes from between the rollers with its emulsion side down. That is, if it were deposited on the wet plate storage table 158 the emulsion side would be facing the table. On the other hand, if the operator was desirous of drying the plate, the passage of the plate through the drying mechanism would be accomplished with the emulsion side of the plate away from the drying drum 156.

The operator has the option of taking either wet or dry plates out of the processing system. If the operator desires wet plates, by the simple expedient of moving selector plate lever arm 141 to position 140 the plates that come from between the squeegee rollers 136 and 138 immediately pass to the top of selector plate 148 and hence, to the storage table 158. The plate material is thus prevented from being fed into the drying system and the plate is immediately useable. If however, the operator desires to dry the masters for reasons of storage, etc. the selector plate lever arm is moved to position 142 at which time selector plate 148 is made to pivot about pivot point 154 bringing plate 148 above the point of intersection with the plate emerging from between rollers 136 and 138. In this latter position, the plate moves out from between the rollers 136 and 138 and is deposited onto a plurality of spaced porous belts (one of which is shown at 144). The belts 144 revolve around the drum 146. The drum is heated by a radiant heater 157 disposed therein. Since the rotation of the drum and all the idlers in the foregoing description is in the direction of the arrows indicated on the respective drum and idlers, it will be seen that the leading edge of the master is projected over drum 146 and into contact with the inside surface of input guide means 150. This input guide is rigidly affixed to mounting plate 152 which also has the selector plate 148 mounted thereon. Thus, as the selector plate 148 and input guide means 150 is moved from the "wet" position 140 to the "dry" position 142 the entire selector assembly is moved in unison. Assuming that the selector lever arm is in the dry position 142 indicated by the dotted lines, it will be obvious that the master will proceed around drum 156 in intimate contact therewith, with the emulsion side away from the drum.

After heating the moisture on the emulsion surface, by conduction from the drum, vaporization is accelerated by blower 159 mounted in housing 28. The blower 159 forces ambient air onto the emulsion surface of the sheet. An exhaust fan 161 is provided to remove air from the dryer housing, thereby, controlling the humidity level therein.

The surface speed of the drum is synchronized with the speed of the drive motor 166 which is coupled to the drive drum shaft 176 by means of the drive belt or chain 162. Belts 144 are continuous and loop around drum 156, drum drive roller 178, and idler rollers 174, 172, and 146 respectively.

Due to the fact that as belts 144 separate from drum 156 prior to looping over drive roller 178 the plate material will have a natural tendency to curl away from the drum. At this point, the plate material is picked up by guide means 160 and made to curl about roller 178 until it reaches fingers 164 where it is forced to lie flat so that it may proceed out through aperture 168 and be collected and/or stored by appropriate means such as hopper 202. With this arrangement, the plate is further dried by the warm air emerging through fan 161.

It should be here noted that it is desirable that the speed of the belt frame assembly be fairly close to that of the drum to avoid unnecessary pulling which will cause streaks to appear on the emulsion of the plate.

*Mode of operation*

Referring now to FIG. 6, there is shown a detailed flow chart indicating the steps in the process of the subject invention for forming an offset master. One of the first things that is done is to prepare the copy shown at station 180 and place the copy on the easel 10, after which, the distance between the copy easel 10 and the lens-prism 14 is set as shown in FIG. 1. This step is indicated at station 182 and is accomplished by means of carriage support means 20 and the additional means (not shown) used to raise and lower easel 10 (FIG. 1). Thereafter, the supply of material 182 is given a timed exposure 186 to expose a portion of the supply material. The exposed portion of the material is then advanced (188) and cut off (190) from the unexposed portion of the supply. All of the above steps are contained and accomplished within housing 24 and have previously been described with regard to FIG. 1.

The processing portion of the system, shown in FIG. 2, is herein contained within the dotted lines 28 and constitutes the successive transportation of the exposed portion through the activator solution shown here as tank 54, and thereafter transporting through a stop bath solution, shown as tank 56. The surface solution is removed by squeegee rollers 136–138.

Thereafter, according to the needs of the operator, the master may be brought out into wet storage by a positioning lever as shown in position 140 or go through a drying process when the lever is in position 142. If wet storage 158 is desired the selector lever will be in the position as shown and the offset master may be taken from wet storage 158 and put onto offset press machine 194 and is ready for use.

If, however, it is necessary to store the masters for any appreciable length of time the selector lever is rotated to the dry position 142 (as shown in FIG. 4) after which it is dried by means of drum 156 and stored in dry storage 192. Thereafter, it may be taken to the offset press machine 194 as previously described.

While we have described what is presently considered a preferred embodiment of our invention, it will be obvious to those skilled in the art that various changes and modifications may be made therein without departing from the inventive concept, and it is aimed in the appended claims to cover all such changes and modifications as fall within the true spirit and scope of our invention.

What is claimed is:

1. A data processing system for producing offset masters from copy comprising in combination:

an easel for supporting the copy having a flat, horizontally disposed work surface mounted for relative movement in a given vertical plane;

lighting means fixed to at least two sides of the easel for movement therewith;

means coupled to the easel for raising and lowering the easel in the vertical plane;

a projection system disposed above the easel in the vertical plane and mounted for relative movement in the plane parallel to the work surface;

a roll of offset master material having a portion thereof disposed in the focal plane of the projection system;

means exposing the portion of offset master material in the focal plane to the copy supported on the easel;

means advancing the exposed portion of offset master material to bring an unexposed portion from the roll into the focal plane;

means severing the exposed portion of offset master material from the roll;

transport means automatically conveying the exposed portion of the offset master material successively through a plurality of processing solutions to produce an offset master of the copy;

means transferring the exposed offset master material to a pair of squeegee rollers to remove excess liquid;

a two position valve;

one position of the valve deflecting the exposed offset master material to a wet storage position; and the other position of the valve directing the offset master material to a drying means and a dry storage position.

2. A data processing system for producing offset masters from copy comprising in combination:

an easel for supporting the copy having a flat, horizontally disposed work surface mounted for relative movement in a given vertical plane;

lighting means fixed to at least two sides of the easel for movement therewith;

means coupled to the easel for raising and lowering the easel in the vertical plane;

a projection system disposed above the easel in the vertical plane and mounted for relative movement in a plane parallel to the work surface;

a roll of offset master material having a portion thereof disposed in the focal plane of the projection system;

means exposing the portion of offset master material in the focal plane to the copy supported on the easel;

means advancing the exposed portion of offset master material to bring an unexposed portion from the roll into the focal plane;

means severing the exposed portion of offset master material from the roll;

a first processing tank having a first liquid contained therein;

a first reservoir tank communicating with the first tank for maintaining the first liquid above a predetermined level;

a first belt frame assembly within the first tank for transporting the exposed portion of offset master material through the first liquid at a predetermined speed;

a second processing tank having a second liquid contained therein;

a second reservoir tank communicating with the second tank for maintaining the second liquid at a predetermined level;

means transferring the exposed offset master material from the first tank to the second tank;

a second belt frame assembly within the second tank for transporting the exposed offset master material through the second liquid at a given rate of speed;
means transferring the exposed offset master material to a pair of squeegee rollers to remove surface liquid;
a two position valve;
one position of the valve deflecting the exposed offset master material to a wet storage position; and
the other position of the valve directing the offset master material to a drying means and a dry storage position.

References Cited by the Examiner

UNITED STATES PATENTS

| | | | |
|---|---|---|---|
| 2,846,920 | 8/1958 | Friedel | 88—24 |
| 2,927,503 | 3/1960 | Zollinger | 88—24 |

NORTON ANSHER, *Primary Examiner.*

R. A. WINTERCORN, *Assistant Examiner.*